(12) United States Patent
Sidorin

(10) Patent No.: US 12,268,954 B2
(45) Date of Patent: Apr. 8, 2025

(54) COMPUTER-READABLE MEDIUM CONFIGURED TO TRANSLATING MOVEMENTS PERFORMED BY A PERSON ONTO A USER IN AUGMENTED OR VIRTUAL REALITY

(71) Applicant: Victor Sidorin, Penza (RU)

(72) Inventor: Victor Sidorin, Penza (RU)

(73) Assignee: JoyWAY LTD, Limassol (CY)

( * ) Notice: Subject to any disclaimer, the term of this patent is extended or adjusted under 35 U.S.C. 154(b) by 382 days.

(21) Appl. No.: 17/971,612

(22) Filed: Oct. 23, 2022

(65) Prior Publication Data

US 2024/0131419 A1 Apr. 25, 2024
US 2024/0226717 A9 Jul. 11, 2024

(51) Int. Cl.
*A63F 13/22* (2014.01)
*A63F 13/24* (2014.01)
*G06F 3/0346* (2013.01)
*G06T 19/00* (2011.01)

(52) U.S. Cl.
CPC .............. *A63F 13/22* (2014.09); *A63F 13/24* (2014.09); *G06F 3/0346* (2013.01); *G06T 19/006* (2013.01)

(58) Field of Classification Search
CPC ........ A63F 13/22; A63F 13/24; G06F 3/0346; G06T 19/06
See application file for complete search history.

(56) References Cited

U.S. PATENT DOCUMENTS

| | | | |
|---|---|---|---|
| 2012/0229508 A1* | 9/2012 | Wigdor | G06T 19/006 345/633 |
| 2015/0356783 A1* | 12/2015 | Miller | G06V 20/80 345/633 |
| 2016/0266386 A1* | 9/2016 | Scott | G06F 3/017 |
| 2017/0003838 A1* | 1/2017 | Cazaux | G06F 3/0481 |
| 2018/0329486 A1* | 11/2018 | Williams | G02B 27/017 |
| 2018/0341386 A1* | 11/2018 | Inomata | A63F 13/211 |
| 2019/0033960 A1* | 1/2019 | Ho | A63F 13/42 |
| 2020/0368616 A1* | 11/2020 | Delamont | H04N 13/239 |

FOREIGN PATENT DOCUMENTS

WO  WO-2018141928 A1 * 8/2018 .............. G06F 3/011

\* cited by examiner

*Primary Examiner* — Omkar A Deodhar
*Assistant Examiner* — Shauna-Kay Hall
(74) *Attorney, Agent, or Firm* — Inventa Capital Group PLC

(57) ABSTRACT

A computer-readable medium is configured to translate movements performed by a person onto a user in augmented or virtual reality has a headset display for wearing by the person, and a first controller and a second controller for holding by the person. Each of the first and second controllers are communicatively connectable to the headset display and including a thumbstick, a first button, a second button, a grip button, and a trigger button. The computer-readable medium is further configured to execute the computer-readable program code to enable the user in the augmented or virtual reality to walk forward by the person forwardly actuating the thumbstick of the first controller and turn by the person tilting left or right the thumbstick of the second controller or by the person physically turning left or right.

1 Claim, 7 Drawing Sheets

FIG. 1
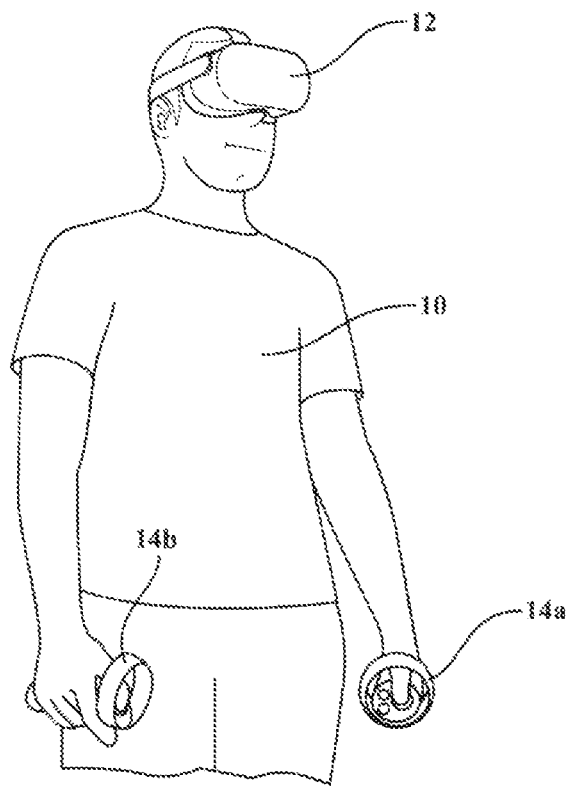
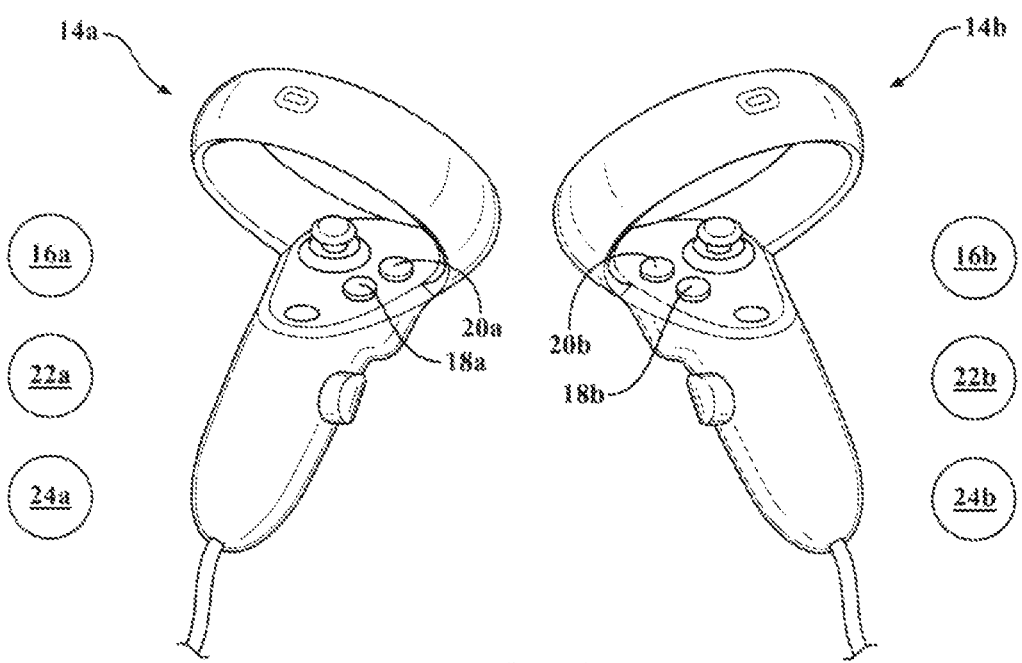
FIG. 1A

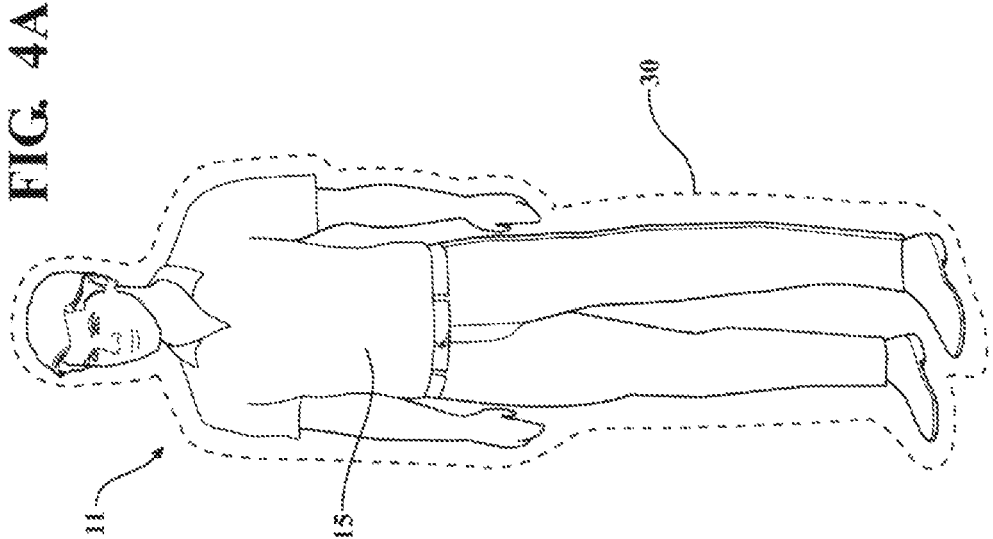
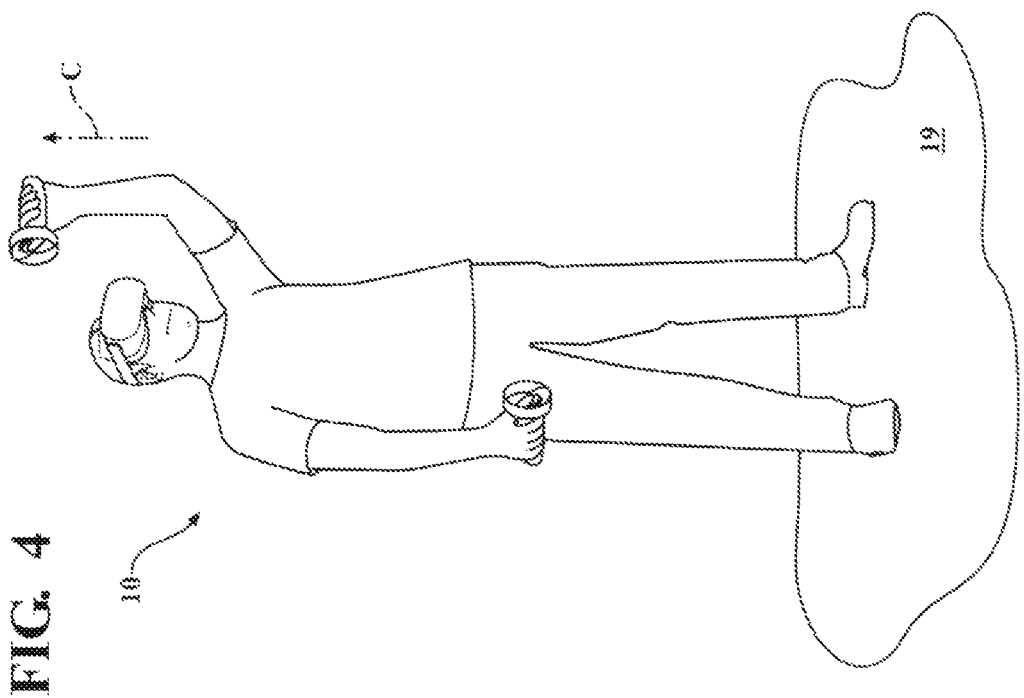

COMPUTER-READABLE MEDIUM CONFIGURED TO TRANSLATING MOVEMENTS PERFORMED BY A PERSON ONTO A USER IN AUGMENTED OR VIRTUAL REALITY

FIELD OF THE INVENTION

The present invention relates generally to a virtual environment such as used in computer gaming, and in particular to controlling movements of a player in an online virtual reality environment.

BACKGROUND OF PRIOR ART

Various simulation games are known in which a 3-D physical world (actual or fantasy) is simulated. Games of this type are sometimes referred to as "virtual reality" or "virtual reality universe" (VRU) games. In known VRU games, an actual or fantasy universe is simulated within a computer memory. Multiple players may participate in the game through a computer network, such as a local area network or a wide area network. Each player selects an "avatar," often a three-dimensional figure of a man, woman, or other being, to represent them in the VRU environment. An "avatar" generally refers to an image representing a user in a multi-user virtual reality (VR) space, or VR-like space. Players send inputs to a VRU engine to move their avatars around the VRU environment, and are able to cause interaction between their avatars and objects in the VRU. For example, a player's avatar may interact with an automated entity or person, simulated static objects, or avatars operated by other players. One example of such a virtual reality game is STRIDE, which is an open-source 2D and 3D cross-platform game engine.

STRIDE is a game with very dynamic avatar movement. The main problem with very dynamic avatar movement virtual reality games, such as STRIDE, is that the player actually stands still and does not move when playing, while the avatar performs a wide range of dynamic movements, which often leads to the player getting motion sickness. This is due to the discrepancy between the signals received by the vestibular apparatus of the player based on what the player sees with his or her eyes and the actual position of the body. As a result, the body has a protective reaction against what it sees, even though in reality the body is static.

There is always a need for a novel system and method adaptable to improve and eliminate drawbacks of other technologies. Therefore, there is a need for a novel system and method to synchronize virtual movements of the avatar and real actions of the player. It would thus be desirable to provide novel system and method for translating or simulating movements performed by the person onto a user or avatar in an augmented or virtual reality.

SUMMARY OF THE INVENTION

To address or solve the drawback of the current technology discussed above, the present invention provides a system and method for translating movements performed by a person onto an avatar or user in an augmented or virtual reality, i.e., synchronizing virtual and real actions of the player. Both in running and in various types of jumping, the system and method of the present invention forces the player to simulate actions with real movements that would lead to the same result in the real world/reality, such as waving your arms when running, swinging them when jumping, etc. As a result, every movement, even the most dynamic, is a conscious choice of the player. Thus, his or her brain expects and anticipates the corresponding result in advance. Consequently, what is expected by the vestibular apparatus of the player and what is seen or observed by the player in a virtual reality coincide, thereby reducing the experience of motion sickness by the player.

According to one form of the present invention, a system for translating movements performed by a person onto an avatar or user in augmented or virtual reality includes a headset display for wearing by a person, a first controller and a second controller for holding by the person, each of the first and second controllers are communicatively connectable to the headset display and including a thumbstick, a first button, a second button, a grip button, and a trigger button, a memory with non-transitory computer-readable program code stored thereon.

The system further includes a processor operatively coupled to the memory with non-transitory computer-readable program code stored thereon. The processor is configured to execute the computer-readable program code to enable the user in the augmented or virtual reality to: i) walk forward by the person forwardly actuating the thumbstick of the first controller, ii) turn by the person tilting left or right the thumbstick of the second controller or by the person physically turning left or right, iii) run by the person (a) forwardly actuating the thumbstick of at least one of the first and second controllers and (b) waving up and down the at least one of the first and second controllers, and iv) jump by the person (a) pressing the first button of the second controller and (b) swinging upwards at least the second controller. The user or avatar is configured such that the user is enclosed in an invisible capsule that simulates an outer perimeter of a body of the user in the augmented or virtual reality.

According to one form of the present invention, a method for translating movements performed by a person onto an avatar or user in augmented or virtual reality includes providing a headset display for wearing by a person, the headset display including a memory with non-transitory computer-readable program code stored thereon and a processor operatively coupled to the memory. The method further includes providing a first controller and a second controller for holding by the person, each of the first and second controllers are communicatively connectable to the headset display and including a thumbstick, a first button, a second button, a grip button, and a trigger button.

The processor is configured to execute the computer-readable program code to enable the user enclosed in an invisible capsule to walk forward by the person forwardly actuating the thumbstick of the first controller; turn by the person tilting left or right the thumbstick of the second controller or by the person physically turning left or right; run by the person (a) forwardly actuating the thumbstick of at least one of the first and second controllers and (b) waving up and down the at least one of the first and second controllers; and jump by the person (a) pressing the first button of the second controller and (b) swinging upwards at least the second controller. The user in the virtual environment is configured such that an invisible capsule encloses the user, which invisible capsule simulates an outer perimeter of a body of the user in the augmented or virtual reality.

An advantage of the present invention is to provide a system and method for synchronizing movements performed by a person with movements of an avatar or user controlled by the person in an augmented or virtual reality to eliminate or at least substantially reduce motion sickness when the person is, for example, playing a dynamic avatar movement virtual reality game. The advantage is achieved by translating movements performed by the person onto the avatar or user in the augmented or virtual reality.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

DESCRIPTION OF THE DRAWINGS

Other advantages of the present invention will be readily appreciated as the same becomes better understood by reference to the following detailed description when considered in connection with the accompanying drawings wherein:

FIG. 1 is a front perspective view of a person using a system to translate movements performed by the person onto a user in a virtual environment, in accordance with the present invention;

FIG. 1A is an enlarged view of the left and right controllers held by the person in FIG. 1;

FIG. 4 is a view of the person of FIG. 1 simulating an act of jumping;

FIG. 4A is a view of an avatar in the virtual environment being enclosed in an invisible capsule;

DETAILED DESCRIPTION OF THE INVENTION

Figure 2:
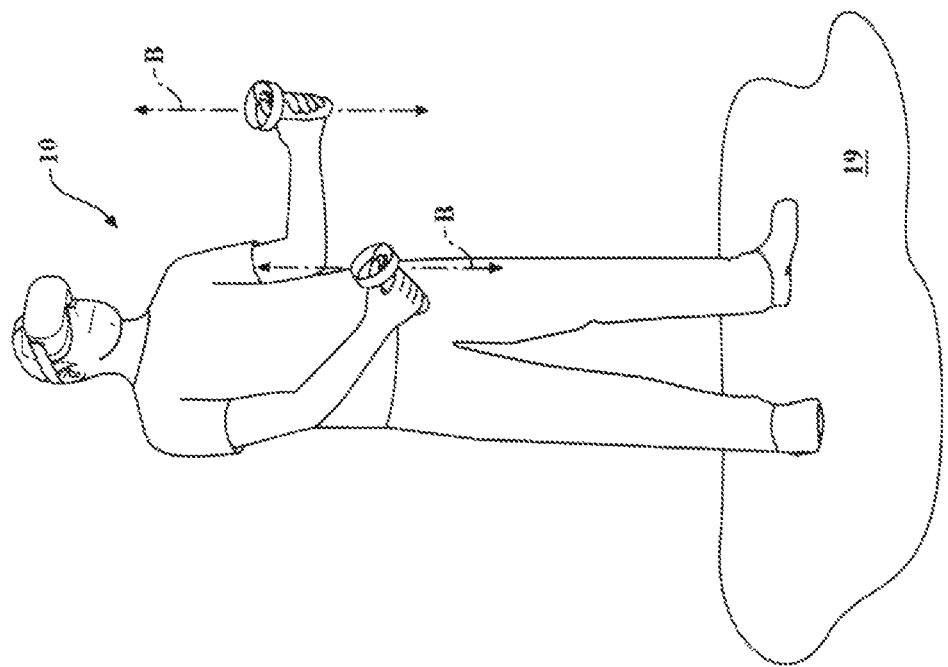
FIG. 2 is a view of the person of FIG. 1 physically performing an act of turning.
Figure 3:
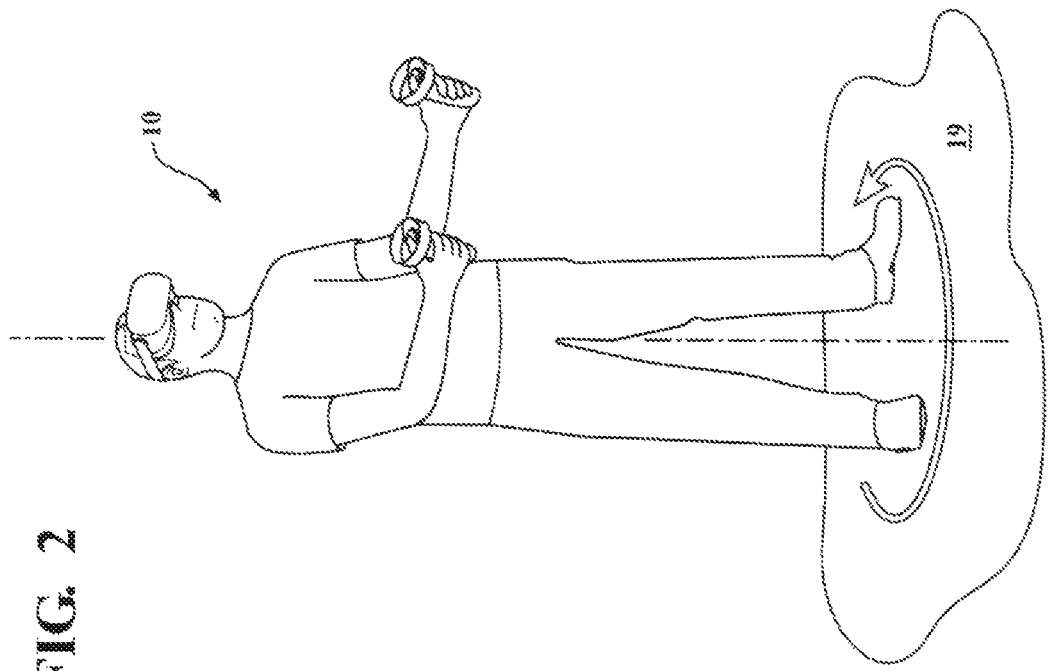
FIG. 3 is a view of the person of FIG. 1 simulating an act of running.

Referring to the figures, system and method for translating movements performed by a person onto a user in augmented or virtual reality is shown in FIGS. 1-8. Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring now to the drawings and the illustrative embodiments depicted therein, as best shown in FIGS. 1 through 4, a system for translating movements performed by a person 10 onto a user or an avatar 11 (FIGS. 4a and 5) in a virtual environment includes a headset display 12 for wearing by the person 10, a first controller 14a held by the left hand of the person 10, and a second controller 14b held by the right hand of the person 10, such as shown in FIG. 1. Each of the first and second controllers 14a and 14b are communicatively connectable to the headset display 12 and each including a respective thumbstick 16a, 16b, first button 18a, 18b, second button 20a, 20b, grip button 22a, 22b, and trigger button 24a, 24b.

The system further includes a memory (not shown) with non-transitory computer-readable program code stored thereon and a processor (not shown). It will be understood that the memory and processor may be included in the headset display 12. Alternatively, the memory and processor may be included in an external computing device.

The processor is operatively coupled to the memory and configured to execute the computer-readable program code to enable the user 11 in the augmented or virtual reality to: (i) walk forward by the person 10 forwardly actuating or pushing forward the thumbstick 16*a* of the first controller 14*a*, (ii) turn left or right by the person 10 tilting to the left or right the thumbstick 16*b* of the second controller 14*b* or by the person 10 physically turning left or right, such as shown for example in FIG. 2 where the person 10 is physically turning in direction A, (iii) run by the person 10 (*a*) forwardly actuating at least one of the thumbsticks 16*a*, 16*b* of respective one of the first and second controllers 14*a*, 14*b* and (b) waving up and down the respective one of the first and second controllers 14*a*, 14*b*, such as shown for example in FIG. 3 where the person 10 waives at least one arm up and down in direction B, and (iv) jump by the person 10 (*a*) pressing the first button 18*b* of the second controller 14*b* and (b) swinging upwards at least the second controller 14*b*, such as shown in FIG. 4 where the person 10 swings at least one arm in the air in direction C.

It will be appreciated that the user 11 is enclosed in an invisible capsule 30 in the virtual environment, as shown in FIG. 4*a*. The invisible capsule 30 simulates an outer perimeter of a body 15 of the user 11 in the augmented or virtual reality. The invisible capsule 30 serves as a collision surface surrounding the user 11 and helps determine if an object hits or grazes the user 11 or the user 11 hits an object. It is envisioned that if the user 11 hits or bumps into an object in the virtual environment the user 11 at least temporarily stops moving or significantly slows down. The invisible capsule 30 is configured to shrink in size during some actions of the user 11, such as for example jumping to simulate an action of bending legs.

It is envisioned within the scope of the present disclosure that whenever the user or avatar 11 encounters a small obstacle in the virtual environment, i.e., an obstacle not requiring to be jumped over, the user climbs over the obstacle automatically. However, the computer-readable program code may be altered to require the person 10 to perform a physical action to climb over even the small obstacle. Further, it is envisioned that the walking speed of the user 11 in the virtual environment is directly proportional to the force of pressing the thumbstick 16*a* of the first controller 14*a*. Additionally, the user 11 in the virtual environment is envisioned as being able to move backwards or sideways whenever the person 10 pulls back or sideways, respectively, the thumbstick 16*a* of the first controller 14*a*.

Alluding to the above, to perform a jump of the user 11 in the virtual environment, the person 10 has to release the first button 18*b* of the second controller 14*b* at the top of the swing of the second controller 14*b*. Thus, the height of the jump of the user 11 in the virtual environment depends on the speed of the upward swing of the second controller 14*b* between pressing and releasing the first button 18*b* of the second controller 14*b*.

Figure 5:
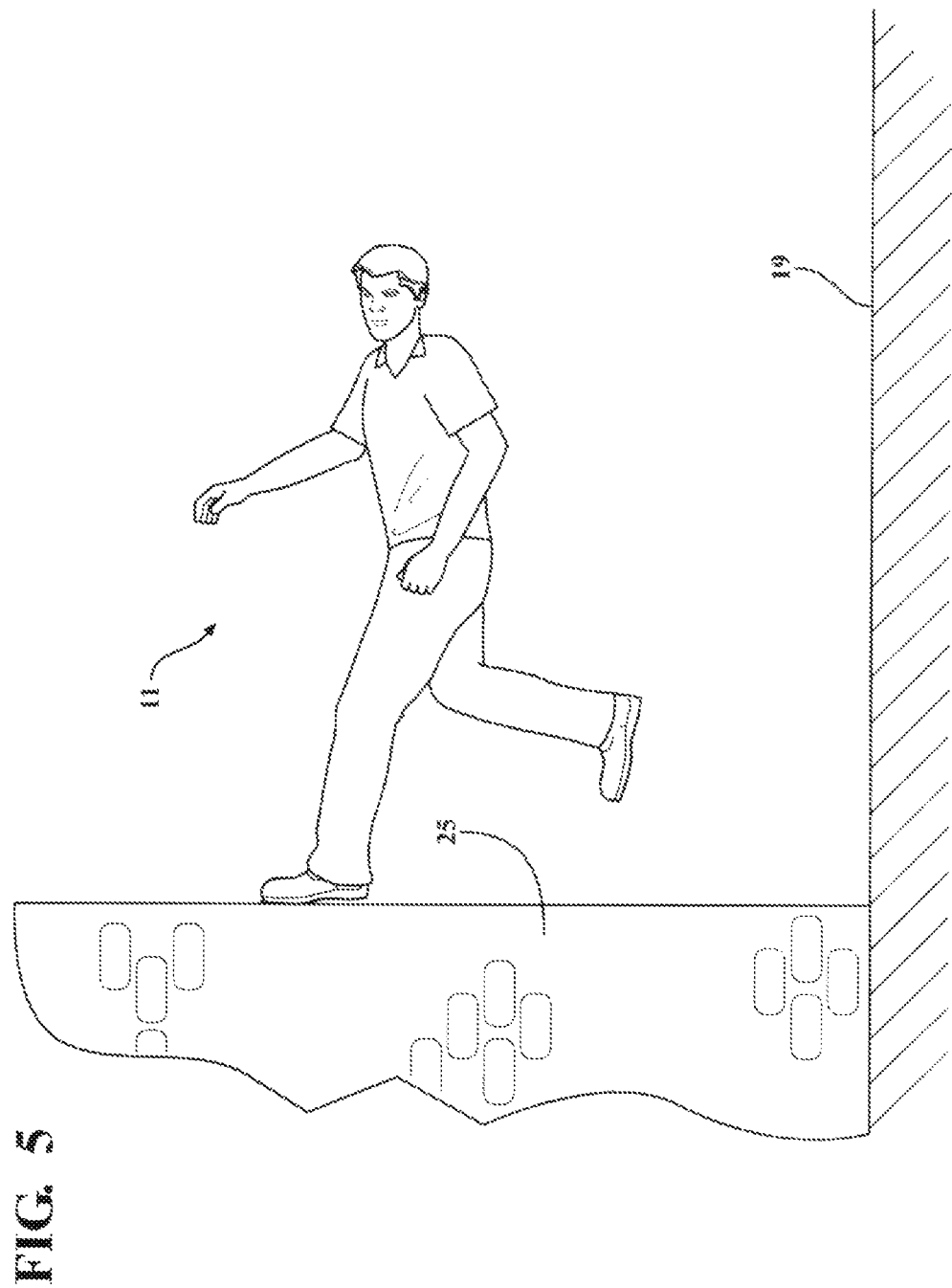
FIG. 5 is a view of an avatar in the virtual environment running along a vertical surface, such as a wall.

Turning now to FIG. 5, the processor is further configured to execute the computer-readable program code to enable the user 11 in the augmented or virtual reality to run along a wall 25 or any somewhat vertical surface relative to ground 19 in response to the person 10 initiating a jump of the user 11 in the augmented or virtual reality towards the wall 25 or any other vertical surface. When the person 10 performs a jump of the user 11, as described above, towards the wall 25, and if the jump is made according to a predefined angle relative to the wall 25, such as for example roughly 45 degrees, then the user 11 is enabled to begin running along the wall 25.

Figure 6:
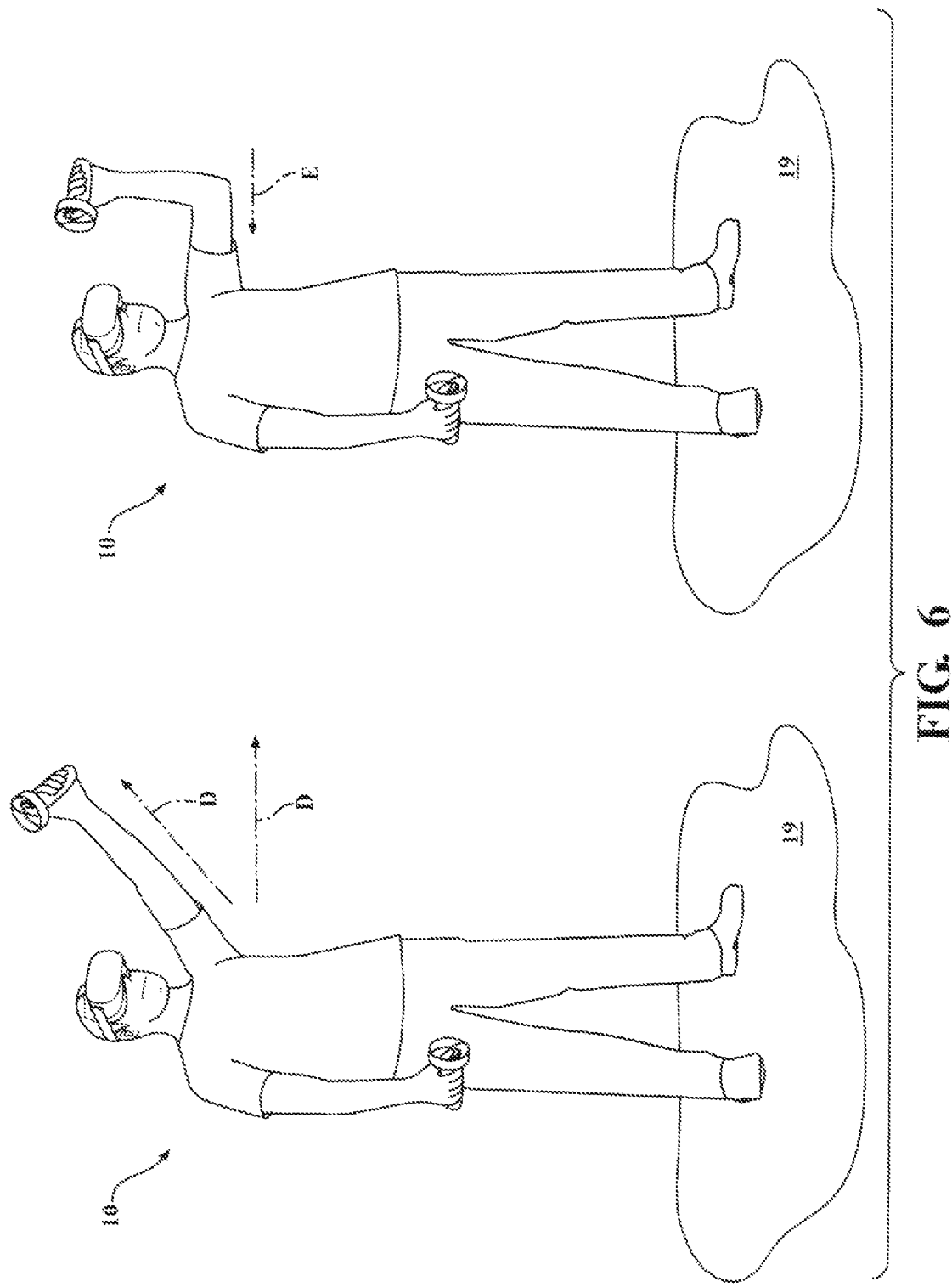
FIG. 6 is a view of the person of FIG. 1 simulating an act of grabbing an object.

The processor of the system of the present disclosure is further configured to enable the user 11 to grab onto various objects (not shown), such as for example a ledge. With reference now to FIG. 6, the processor is configured to execute the computer-readable program code to enable the user 11 in the augmented or virtual reality to grab onto an object by the person 10 (*a*) extending at least one of the first and second controllers 14*a*, 14*b* towards the object in the virtual environment, as shown by directions D in FIG. 6, (b) pressing the grip button 22*a* or 22*b* of the at least one of the first and second controllers 14*a*, 14*b*, and (c) pulling the at least one of the first and second controllers 14*a*, 14*b* towards the person 10, as shown by direction E in FIG. 6. It is further contemplated that the direction E can be downwardly to simulate the action of performing a pull-up by the person 10. The user 11, after grabbing the object such as for example a ledge of a roof, is enabled to automatically climb over the object, such as for example to get on top of the roof. It will also be appreciated that, to grab onto objects, the virtual arm of the user 11 can traverse distances that are somewhat farther (by a predefined distance) than the extent of the user's arm.

Figure 7:
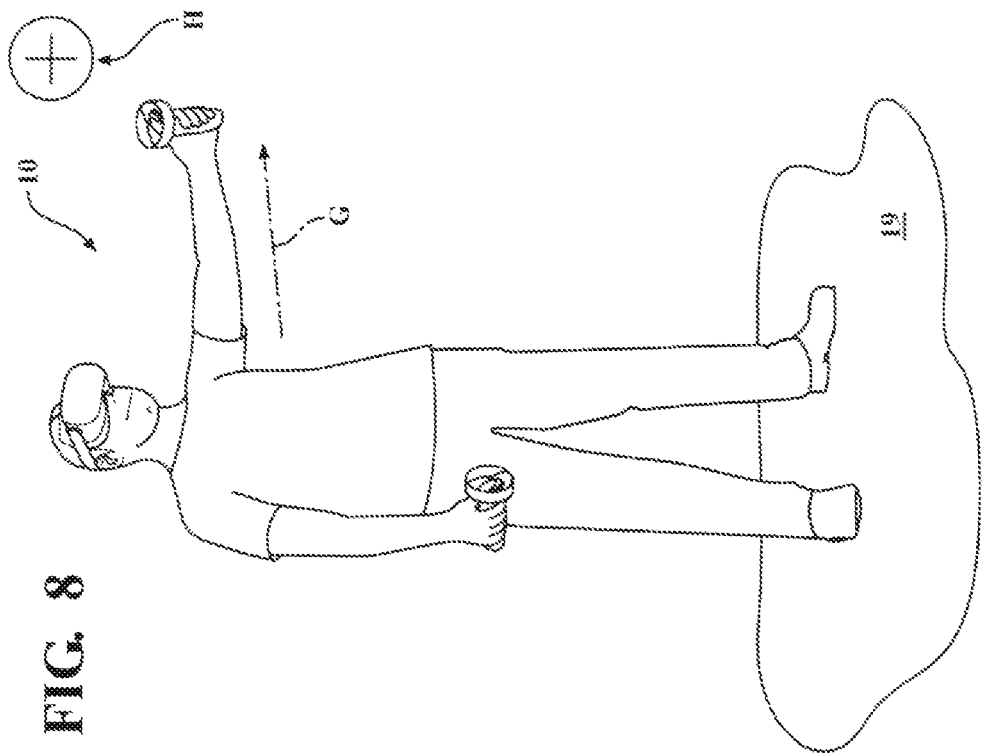
FIG. 7 is a view of the person of FIG. 1 simulating an act of sliding.
Figure 8:
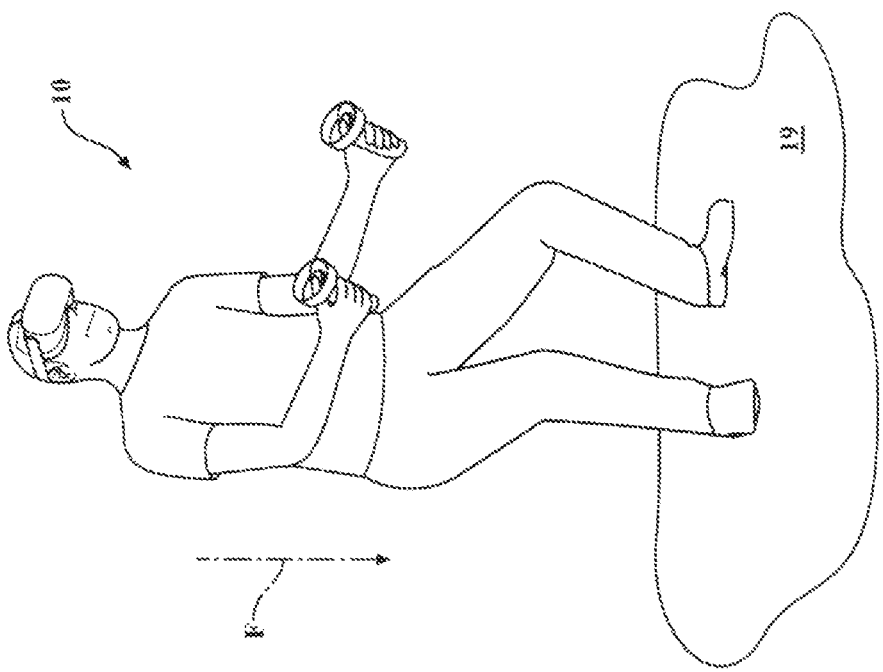
FIG. 8 is a view of the person of FIG. 1 simulating an act of launching a grappling hook.

Referring now to FIG. 7, the processor is further configured to execute the computer-readable program code to enable the user 11 in the augmented or virtual reality to slide tackle under an obstacle by the person 10 (*a*) initiating a run or temporary increase in speed of the user 11 in the augmented or virtual reality, as described above, and (b) crouching down in direction F, such as shown in FIG. 8. It should be noted that the invisible capsule 30 of the user 11 is programmed to shrink during the slide tackle of the user 11. The user 11 in the augmented or virtual reality is enabled to slide tackle or stay in the slide tackle position for a predefined period of time. After the predefined period of time is up, the user 11 is enabled to automatically get up or stand up.

The user 11 is also enabled by the system of the present disclosure to perform an extended slide, rather than a slide tackle. The extended slide is executed by the user 11 either automatically or by the person 10 performing a physical action, depending on a predefined angle of a slope the user 11 encounters. When the user 11 encounters a downward sloping surface or an incline that is greater than, for example, 40 degrees relative to the ground 19, the user 10 is enabled to automatically slide down the slope upon contact with the inclined surface. However, when the user 11 encounters an incline that is less than, for example, 40 degrees relative to the ground 19, the person 10 has to crouch in the direction F shown in FIG. 7 to initiate the extended slide. It will also be appreciated that the user 11 may be similarly enabled to slide upwardly or up the slope. It is further envisioned that the person 10 can perform steps to enable the user 11 to jump out of the extended slides.

The user 11 is further enabled by the system of the present disclosure to grab cables, such as for example a zip line, and slide down the cables. The processor is configured to execute the computer-readable program code to enable the user 11 in the augmented or virtual reality to grab a cable and automatically slide by the user 11 along the cable by the person 10 pressing the grip button 22*a* or 22*b* of at least one of the first and second controllers 14*a*, 14*b* when the user 11 is near the cable. The user 11 is enabled to release the cable by the person 10 releasing the grip button 22*a* or 22*b*. It should be noted that the invisible capsule 30 around the user 11 is programmed to shrink enabling the user 11 to slide along the cable.

With reference to FIG. 8, the user 11 is further enabled by the system of the present disclosure to cast or launch an object, such as for example a grappling hook. The processor is configured to execute the computer-readable program code to enable the user 11 in the augmented or virtual reality to launch a grappling hook while the person 10 is conducting a jump of the user 11 in the virtual environment, as described above. As such, the grappling hook launched by the user 11 extends or prolongs a jumping distance of the user 11. The grappling hook of the user 11 is launched by the person 10 (a) pressing the grip button 22a or 22b of respective one of the first and second controllers 14a, 14b, (b) aiming, for example in direction G shown in FIG. 8, the respective one of the first and second controllers 14a, 14b at a point H that is away in the virtual environment from the user 11, and (c) actuating the trigger button 24a or 24b of the respective one of the first and second controllers 14a, 14b so that the grappling hook launches and attaches to the point H that is away from the user 11. The invisible capsule 30 of the user 11 is programmed to shrink while the user 11 is using the grappling hook.

A method for translating movements performed by the person 10 onto the user 11 in the virtual environment includes (i) providing a headset display 12 to be worn by the person 10 and that includes the memory with non-transitory computer-readable program code stored thereon and the processor operatively coupled to the memory, (ii) providing the first controller 14a and the second controller 14b to be held by the person 10. Each of the first and second controllers 14a, 14b are communicatively connectable to the headset display 12 and including respective thumbstick 16a, 16b, first button 18a, 18b, second button 20a, 20b, grip button 22a, 22b, and trigger button 24a, 24b. The processor is configured to execute the computer-readable program code to enable the user 11 enclosed in the invisible capsule 30 to (i) walk forward by the person 10 forwardly actuating the thumbstick 16a of the first controller 14a; (ii) turn by the person 10 tilting left or right the thumbstick 16b of the second controller 14b or by the person 10 physically turning left or right; (iii) run by the person 10 (a) forwardly actuating respective one of the thumbsticks 16a, 16b of at least one of the first and second controllers 14a, 14b and (b) waving up and down the at least one of the first and second controllers 14a, 14b; and (iv) jump by the person 10 (a) pressing the first button 16b of the second controller 14b and (b) swinging upwards at least one of the first and second controllers 14a, 14b. The invisible capsule 30 is programmed to enclose the user 11 to simulate the outer perimeter of the body 15 of the user 11 in the augmented or virtual reality.

A jump of the user 11 in the virtual environment is completed, after the person upwardly swings at least one of the first and second controllers 14a, 14b, by the person 10 releasing the first button 18b of the second controller 14b at a desired height of an upward swing by the person 10. A height of the jump of the user 11 in the augmented or virtual reality is based on a speed of the upward swing by the person 10 between pressing and releasing the first button 18b of the second controller 14b. The invisible capsule 30 shrinks to enable the user 11 to jump in the augmented or virtual reality.

A speed of walking of the user 11 in the augmented or virtual reality is based on and proportional to a force of actuation of the thumbstick 16a of the first controller 14a by the person 10. A speed of running of the user 10 in the augmented or virtual reality is not controllable by the person 10. The user 11 is enabled to walk backwards in the augmented or virtual reality by the person 10 backwardly actuating the thumbstick 16a of the first controller 14a, and wherein the user 11 is enabled to walk sideways in the augmented or virtual reality by the person 10 actuating the thumbstick 16a of the first controller 14a in a left direction or in a right direction. The user 11 is enabled to automatically climb over an obstacle encountered by the user 11 in the augmented or virtual reality by the person 10 forwardly actuating the thumbstick 16a of the first controller 14a.

Figure 9:
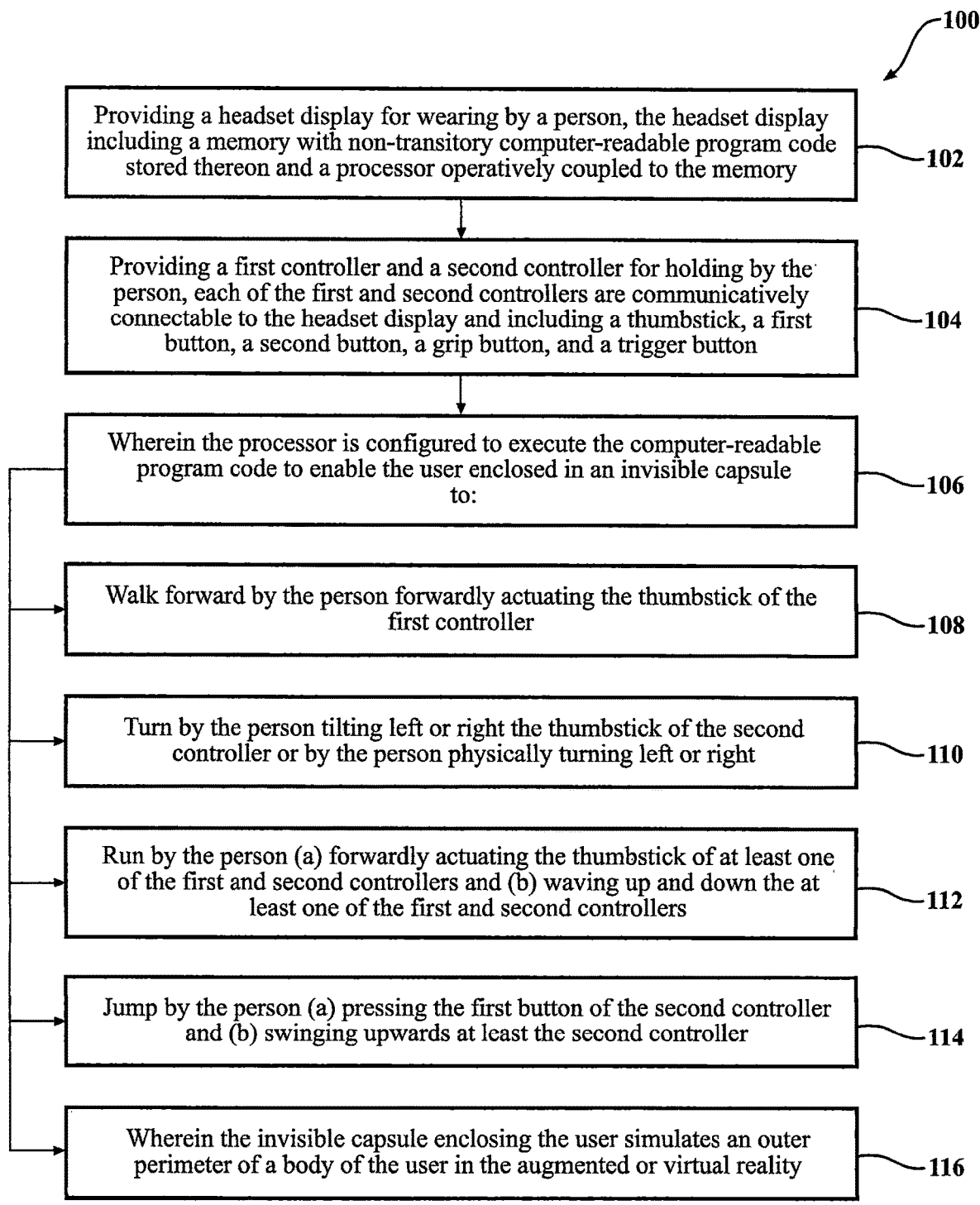

Referring to FIG. 9, a computer-readable medium configured to store instructions for translating movements performed by a person onto a user in augmented or virtual reality, is generally shown at 100. The computer-readable medium is configured to the instructions comprising: providing a headset display for wearing by a person, the headset display including a memory with non-transitory computer-readable program code stored thereon and a processor operatively coupled to the memory, as shown at 102 followed by providing a first controller and a second controller for holding by the person, each of the first and second controllers are communicatively connectable to the headset display and including a thumbstick, a first button, a second button, a grip button, and a trigger button, as shown at 104.

As shown at 106, the processor is configured to execute the computer-readable program code to enable the user enclosed in an invisible capsule to: walk forward by the person forwardly actuating the thumbstick of the first controller, shown at 108, turn by the person tilting left or right the thumbstick of the second controller or by the person physically turning left or right, as shown at 110, run by the person (a) forwardly actuating the thumbstick of at least one of the first and second controllers and (b) waving up and down the at least one of the first and second controllers, shown at 112, and jump by the person (a) pressing the first button of the second controller and (b) swinging upwards at least the second controller, shown at 114, wherein the invisible capsule enclosing the user simulates an outer perimeter of a body of the user in the augmented or virtual reality, shown at 116.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing.

The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium configured to store instructions for translating movements performed by a person onto a user in augmented or virtual reality, the instructions comprising:

providing a headset display for wearing by a person, the headset display including a memory with non-transitory computer-readable program code stored thereon and a processor operatively coupled to the memory;

providing a first controller and a second controller for holding by the person, each of the first and second controllers are communicatively connectable to the headset display and including a thumbstick, a first button, a second button, a grip button, and a trigger button;

wherein the processor is configured to execute the computer-readable program code to enable the user enclosed in an invisible capsule to:

walk forward by the person forwardly actuating the thumbstick of the first controller;

turn by the person tilting left or right the thumbstick of the second controller or by the person physically turning left or right;

run by the person (a) forwardly actuating the thumbstick of at least one of the first and second controllers and (b) waving up and down the at least one of the first and second controllers; and jump by the person (a) pressing the first button of the second controller and (b) swinging upwards at least the second controller;

wherein the invisible capsule enclosing the user simulates an outer perimeter of a body of the user in the augmented or virtual reality.

* * * * *